Patented July 3, 1928.

1,675,498

UNITED STATES PATENT OFFICE.

ERWIN KRAMER, OF COLOGNE-DEUTZ, GERMANY, ASSIGNOR TO GRASSELLI DYESTUFF CORPORATION, OF NEW YORK, N. Y., A CORPORATION OF DELAWARE.

SULPHUR DYESTUFF.

No Drawing. Application filed August 3, 1927. Serial No. 210,460, and in Germany August 17, 1926.

The present invention relates to new sulphur dyestuffs more particularly to the dyestuffs which are obtainable by heating 2-nitro-or 2-amino-4-acetyltoluidine of the forumla:

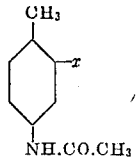

wherein $x$ stands for a nitro- or amino- group with sulphur at an elevated temperature and in the presence of about 2-8 mols benzidine.

We prefer to use temperatures of about 200–260° C. The quantity of sulphur to be added may vary in wide limits. Preferably 2–4 parts by weight of sulphur should be added in proportion to one part by weight of the mixture from acetyltoluidine compound and benzidine.

Our new dyestuffs dye cotton orange shades of excellent fastness to boiling and a clearness which has been unobtainable hitherto from sulphur dyestuffs.

The following example will illustrate our invention all parts being by weight:

Example.

10 parts 2-nitro-4-acetyltoluidine, 47.5 parts benzidine and 115 parts sulphur are heated with stirring for several hours at temperatures rising from 200–260° C. The melt is powdered, dissolved in sodium sulphide solution or caustic soda lye and the dyestuff precipitated with acid. It forms a brown powder and dyes cotton from baths containing sodium sulphide orange brown shades which on steaming or acidifying pass into bright clear orange.

When using instead of the 2-nitro-4-acetyltoluidine the equivalent quantity of 2-amino-4-acetyl-toluidine, a similar dyestuff is obtained. When working at lower temperatures more yellow shades result.

We claim:

1. As new products the sulphur dyestuffs which are obtainable by heating a compound of the general formula:

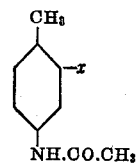

wherein $x$ stands for a nitro- or an amino-group at an elevated temperature with sulphur in the presence of about 2–8 mols benzidine and which dye cotton from baths containing sodium sulphide orange-brown shades passing on steaming or acidifying into bright clear orange shades.

2. As a new product the sulphur dyestuff which is obtainable by heating 2-nitro-4-acetyltoluidine with sulphur in the presence of about 2–8 mols benzidine at a temperature of about 200–260° C. and which dyes cotton from baths containing sodium sulphide orange-brown shades passing on steaming or acidifying into bright clear orange shades.

3. The process for preparing new sulphur dyestuffs which consists in heating a compound of the general formula:

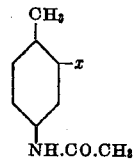

wherein $x$ stands for a nitro- or an amino-group with sulphur in the presence of 2–8 mols benzidine at an elevated temperature.

4. The process for preparing a new sulphur dyestuff which consists in heating 2-nitro-acetyltoluidine to a temperature of 200–260° C. with sulphur in the presence of about 2–8 mols benzidine.

In testimony whereof I have hereunto set my hand.

ERWIN KRAMER.